(12) United States Patent
Imlach (10) Patent No.: US 6,448,679 B1
(45) Date of Patent: Sep. 10, 2002

(54) PASSIVE MAGNETIC SUPPORT AND DAMPING SYSTEM

(76) Inventor: Joseph Imlach, 4141 B St., Suite 209, Anchorage, AK (US) 99503

( * ) Notice: Subject to any disclaimer, the term of this patent is extended or adjusted under 35 U.S.C. 154(b) by 0 days.

(21) Appl. No.: 09/739,086

(22) Filed: Dec. 14, 2000

(51) Int. Cl.7 .................................................. H02K 7/09
(52) U.S. Cl. ............................ 310/90.5; 310/90; 310/10
(58) Field of Search ............................ 310/90.5, 90, 51; 417/423.4

(56) References Cited

U.S. PATENT DOCUMENTS

| | | | | |
|---|---|---|---|---|
| 5,126,610 A | * | 6/1992 | Fremerey | 310/90.5 |
| 5,152,679 A | * | 10/1992 | Kanemitsu et al. | 417/423.4 |
| 5,196,748 A | * | 3/1993 | Rigney | 310/90.5 |
| 5,220,232 A | * | 6/1993 | Rigney, II et al. | 310/90.5 |
| 5,394,044 A | * | 2/1995 | Yamamura | 310/90.5 |
| 5,521,448 A | * | 5/1996 | Tecza et al. | 310/90.5 |
| 6,191,515 B1 | * | 2/2001 | Post | 310/90.5 |
| 6,213,737 B1 | * | 4/2001 | Murakami et al. | 417/423.4 |

* cited by examiner

Primary Examiner—Karl Tamai
Assistant Examiner—Thanh Lam
(74) Attorney, Agent, or Firm—Michael J. Tavella (57) ABSTRACT

A type of passive magnetic bearing that provides for both positive radial stiffness and significant levels of passive radial damping. Axial damping and axial forces can also be generated with minor modifications to the basic configuration. The bearing is comprised of a series of magnet, damping, and rigid non-magnetic elements essentially defining a laminated or composite structure. The damping material is directly mounted between the magnets and a rigid material, resulting in constrained layer damping. The range of motion of these floating, or soft mounted, magnets may also be restricted to generate higher stiffness in response to large vibrations.

28 Claims, 6 Drawing Sheets

PASSIVE MAGNETIC SUPPORT AND DAMPING SYSTEM

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

The present invention relates to the field of magnetic bearing or suspension systems. More specifically, the invention is directed towards a passive radial magnetic bearing system that includes damping elements and may also include a mechanism to provide increased stiffness at large rotor amplitudes.

2. Description of Related Art

Passive magnetic bearings are well known in the art. Many configurations of these types of bearings are possible (e.g. U.S. Pat. Nos. 5,894,181; 5,619,083; 4,072,370; 3,958,842; and 3,614,181 among others). Each of these configurations suffers from a lack of damping. Rotors supported on these types of bearings, therefore, will be poorly damped. This condition results in large vibrational amplitudes when the rotors traverse their critical speeds, increased sensitivity to imbalance forces, and decreased resistance to rotordynamic instabilities. This combination sometimes results in failure of the machines.

Many various techniques for introducing damping into passive magnetic systems have been developed (e.g. U.S. Pat. Nos. 5,910,695; 5,679,992; 5,521,448; and 5,386,166). Some of these methods have developed eddy current dampers, but these generally provide very low damping levels. An alternative method, utilized in some of the above patents, is to use a damping material, such as an elastomeric material or a woyen material, to provide the damping. Many different configurations of this approach have also been disclosed. These configurations generally rely on introducing an intermediate housing between the rotor and the machine frame. In general, the stationary portion of the passive magnetic bearing is mounted in the intermediate housing. The damping material is then positioned between the intermediate housing and the machine frame. Undesired rotor vibrational forces are transmitted from the rotor magnets to the stator magnets through the magnetic field. The transmitted vibrational forces cause movement of the stator magnets, and the intermediate housing into which the magnets are mounted. The motion is resisted by the damping material, either in shear or in compression. The resistance of the damping material to the vibrations results in frictional forces, thus dissipating the vibrational energy.

This approach has several limitations. First, the intermediate housing represents an additional component that must be manufactured and assembled, adding to system cost and complexity. Secondly, the intermediate housing has a finite, and usually substantial, mass that is added to the bearing mass. This results in a reduction in the resonant frequency of the combined bearing stator and intermediate housing, above which a loss of damping occurs. Finally, in this configuration, all of the forces transmitted through the bearing must pass through the damping element. This limits the designers' ability to independently adjust the stiffness and damping of the bearing system to optimize rotordynamic performance.

In addition, several of these configurations rely on a single ring of magnetic material on each of the stator and rotor sections. Variations in the magnetic strength of the rotor and stator magnet materials result in variations of the magnetic forces as one ring rotates relative to the other. This results in "magnetic run-out," or a mechanical vibration of the rotor due to unbalanced magnetic forces. This sensitivity to variations in the magnetic field strength of the bearing magnets is undesirable.

BRIEF SUMMARY OF THE INVENTION

It is therefore an object of the current invention to provide a passive magnetic support and damping system without the above listed drawbacks.

It is therefore a further object of the present invention to provide a passive magnetic support and damping system that is made of easily manufacturable components in a readily assemblable configuration.

It is therefore a still further object of the present invention to provide a passive magnetic support and damping system that provides increased stiffness in response to large amplitude vibrations.

It is therefore a still further object of the present invention to provide a passive magnetic support and damping system that is minimally sensitive to variations in the magnetic properties of the permanent magnet materials used.

These and other objects of the present invention, which will become apparent hereinafter, are achieved by providing a passive magnetic support and damping system in which the rotor portion of the damping system is comprised of a series of disks or annular rings of permanently magnetized material fixedly attached to the rotor of the machine. The stator portion is also comprised of a series of annular rings of permanently magnetized material, which are positioned concentrically with the rotor magnets. The stator and rotor magnets are formed and positioned such that a radial gap is present between said stator magnets and said rotor magnets. At least one, and preferably an even number, of the stator magnets are mounted in a damping material, which, in turn, is fixedly attached to the machine stator. This damping material may be an elastomeric material, a woven material, or any other type of material that exhibits primarily frictional losses in response to shear or compressive strains. The "soft mounted" stator magnet(s) provide damping to the system. The remaining stator magnets are fixedly attached to the machine stator and provide stiffness ("hard mounted"). By varying the number, size, and magnetic strength of the stator magnets mounted in these two ways, the stiffness and damping of the bearing assembly can be varied substantially independently. Further, because only a single stator magnet is interposed between the rotor and each layer of damping material, the resonant frequency of the damping mechanism is very high (i.e. the effective mass of each damper element is minimized). This results in improved damping at higher frequencies than was available in the prior art.

An additional feature of the present invention is that the soft mounted stator magnets can be provided with a backing material that limits their displacement. When the soft mounted magnets come into contact with the backing material, they effectively become hard mounted, and contribute additional stiffness to the system. In this manner large excursions of the rotor, which cause large displacements of the soft mounted magnets, will result in increased bearing stiffness, tending to restore the rotor to the nominal position.

BRIEF DESCRIPTION OF THE DRAWINGS

FIG. 1a is an enlarged detail view of the inset 1a shown in FIG. 1.

DETAILED DESCRIPTION OF THE INVENTION

Figure 1:
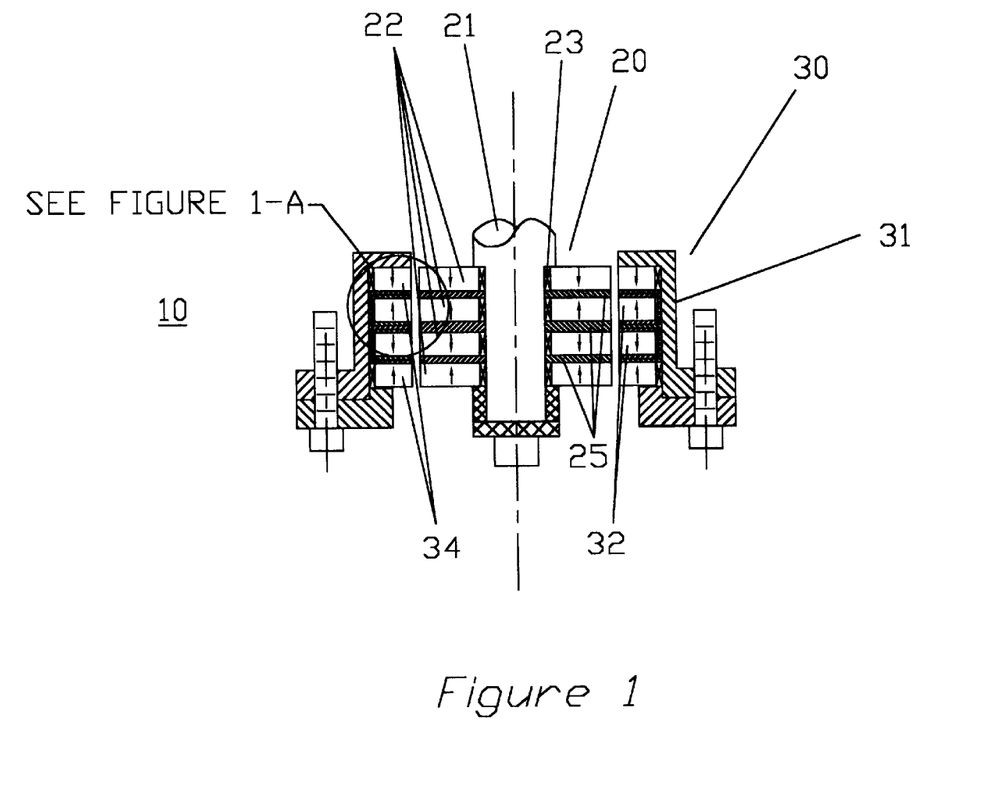
FIG. 1 is a cross sectional view of a passive magnetic support and damping system configured to provide radial stiffness and damping with minimal axial forces.

Referring now to FIG. 1 one configuration of a radial bearing 10 according to the present invention is shown. The bearing is comprised of a rotor element 20 and a stator element 30. The rotor element is typically attached to a shaft 21 and is further comprised of at least one rigidly mounted magnet 22. Said rotor magnet(s) may be directly mounted to the shaft, or may be mounted with a spring element 23 (e.g. a Tolerance Ring; manufactured by USA Tolerance Rings, West Trenton N.J.) with a spring constant significantly higher than the stiffness of the magnetic field between the rotor and stator magnets. Such spring elements allow some differential expansion between the shaft 21 and housing 31 and the magnets 22 and/or 34, without generating excessive stresses in the magnets. The rigidly mounted rotor magnets may be spaced axially from each other by means of rigid spacers 25. These spacers may be made of a magnetic material but are preferably non-magnetic.

The stator element can be mounted into a housing 31, which is attached to the non-rotating portion of the machine, not shown. Alternatively, the stator elements can be directly mounted into the machine. The stator element is further comprised of at least one magnet 32 mounted concentrically with the rotor magnet. Said magnet(s) are attached on at least one side, but preferably both sides, to a damping material 33, such as a viscoelastic material, an elastomer, a woven or felted metal, or another material that exhibits frictional shear losses resulting in damping. The damping material is in turn attached to a structure that is rigidly mounted to the fixed portion of the stator housing. This structure may be another concentrically mounted magnet 34, a rigd spacer element 35, the stator housing 31 or any other element that is fixedly attached to the stationary machine. Functionally, the "soft mounted" stator magnets 32 are allowed to follow the radial vibrations of the "hard mounted" rotor magnets 22. The motion of the soft mounted stator magnets results in shearing of the damper materials 33. Thus, vibrational motions of the rotor magnets are transmitted through the magnetic coupling, producing vibrational motions of the soft mounted stator magnets. This motion is in turn transmitted to shear or compressive deformations of the damping material, further resulting in frictional dissipation of the vibrational energy. This frictional dissipation provides damping to the rotor through the magnetic coupling. In the illustrated example, additional magnetic coupling between the hard mounted rotor magnets 22 and the hard mounted stator magnets 34 provide bearing stiffness.

Also in FIG. 1 it is seen that the soft mounted magnets are surrounded on their outside diametral surface by a radial gap 36 which allows radial displacements to occur. These radial displacements are necessary to generate the damping. The low stiffness of the damping material, however, reduces the overall stiffness of the bearing that would normally be expected of magnets of the given size and material properties. By introducing a rigid backing material 37 which limits the radial displacement of the soft mounted magnets, this stiffness can be partially restored in response to large vibrations. Alternatively, the full radial area shown as gap 36 and element 37 could be filled with additional damping material, increasing the effective damping of the system.

In the preferred embodiment, more than one rigidly mounted magnet is present in the rotor portion of the bearing to reduce the effects of variations in the magnetic properties of any one magnet. In addition, in the preferred embodiment, the magnets are magnetized in the axial direction, as shown in the figure. Radially magnetized magnets in both the rotor and stator segments, arranged in opposition, would also work but are more difficult to produce.

Figure 2:
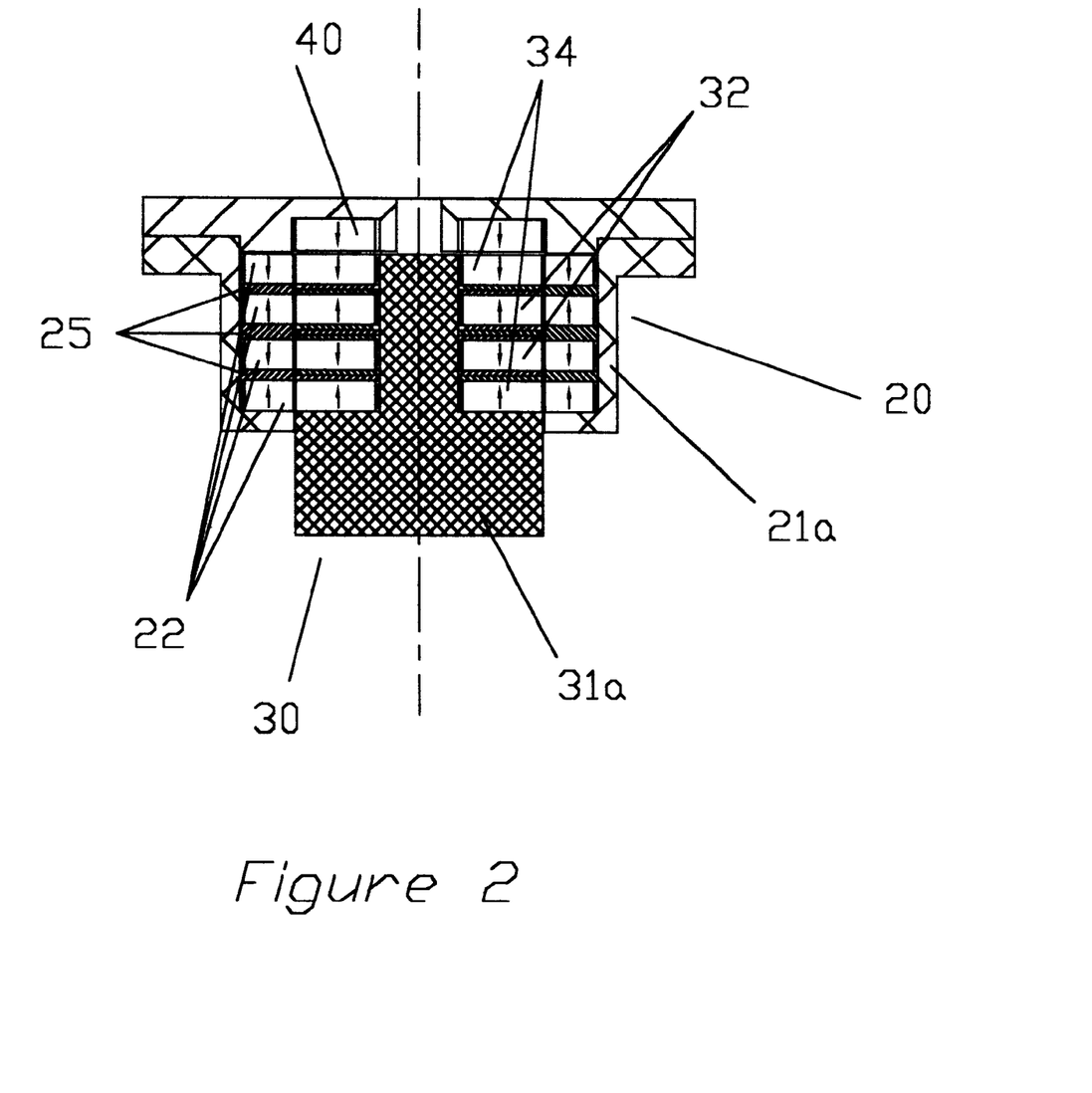
FIG. 2 is a cross sectional view of a passive magnetic support and damping system configured to provide radial stiffness and damping and in addition to provide an axial force.

FIG. 2 illustrates a different embodiment of the present invention in which the rotor element 20 surrounds the stator element 30. In this illustration, the rotor magnets 22 are positioned about the outside diameter of the stator magnets 32 and 34. This arrangement results in radial pre-compression of the rotor magnets, which is advantageous for high-speed applications in which the rotational stresses may cause tensile failure of the rotating magnets. Also, an additional magnet 40 has been added to the rotor element to generate an axial force. This is beneficial in situations in which a static load, such as gravity, needs to be countered. Depending on the configuration of the machine, additional magnets generating axial forces could be added to the rotor, the stator, or both.

Figure 3:
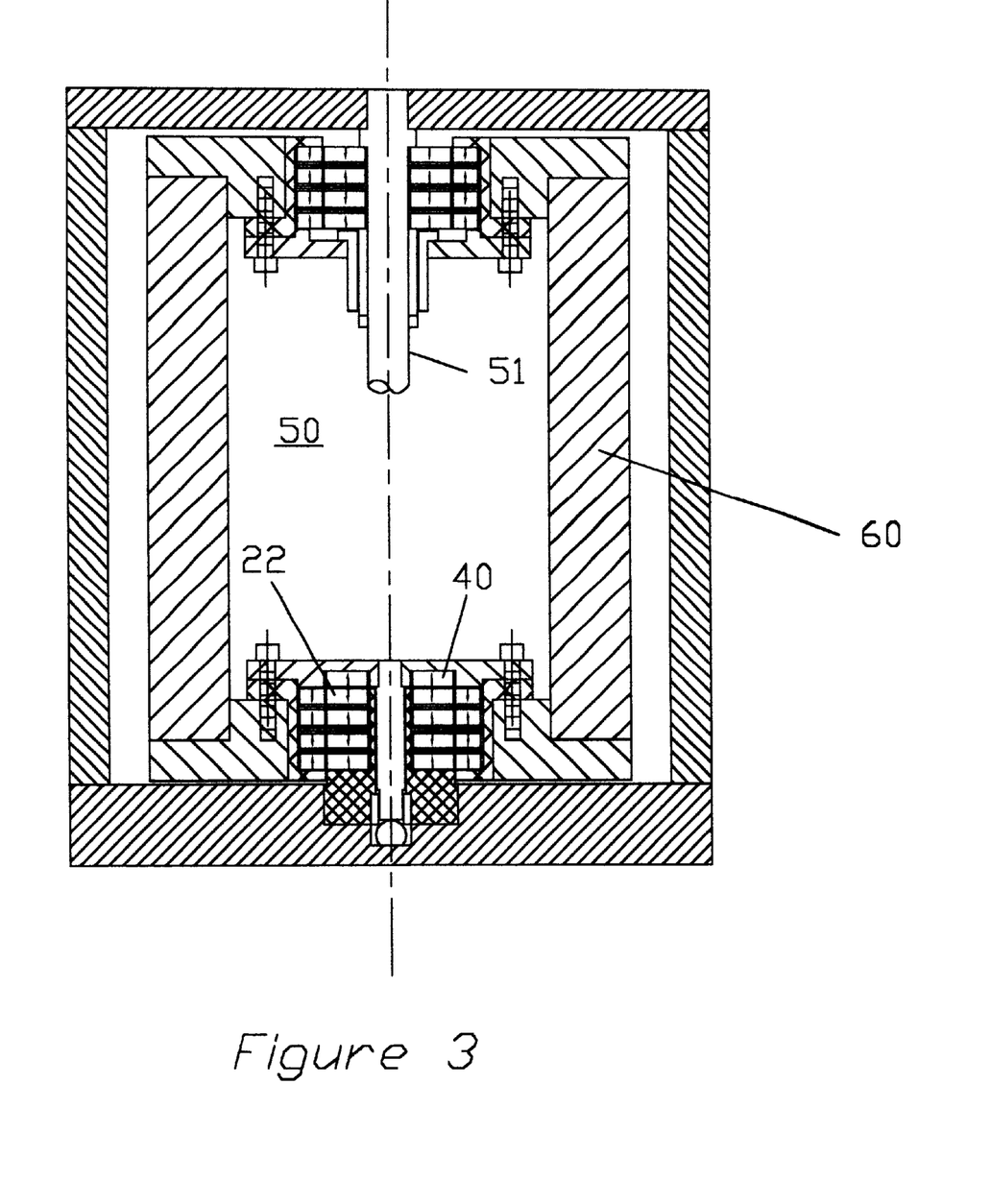
FIG. 3 is a cross sectional schematic view of an example showing a small flywheel utilizing passive magnetic support and damping systems to provide radial support and axial pre-load.

Two possible arrangements of additional magnets 40 exist: 1) the additional magnet can generate a repulsive force between the rotor and stator as shown in the bottom bearing of FIG. 3 or 2) the additional magnet can generate an attractive force between the rotor and the stator as shown in the example of FIG. 2.

In the case of FIG. 2, the attraction between the stator magnet 34 and the additional rotor magnet 40 increases the positive radial stiffness and the magnitude of the negative axial stiffness of the bearing. This increased radial stiffness is often advantageous. The attractive force on the additional magnet, however, tends to pull it out of its housing, complicating the task of assembly.

In the axial repulsive force configuration (FIG. 3), the radial stiffness of the bearing assembly is reduced, but a positive axial stiffness element is introduced. The overall axial stiffness of the bearing remains negative, but the magnitude is reduced. In addition, in this case, the repulsive force tends to keep the additional magnet in the housing, reducing the required complexity of the housing. In the example flywheel shown in FIG. 3, a motor generator, not shown, could be placed internal to the flywheel body 60 inside the cavity 50. Electrical leads for this device could enter through a hollow shaft 51.

Figure 4:
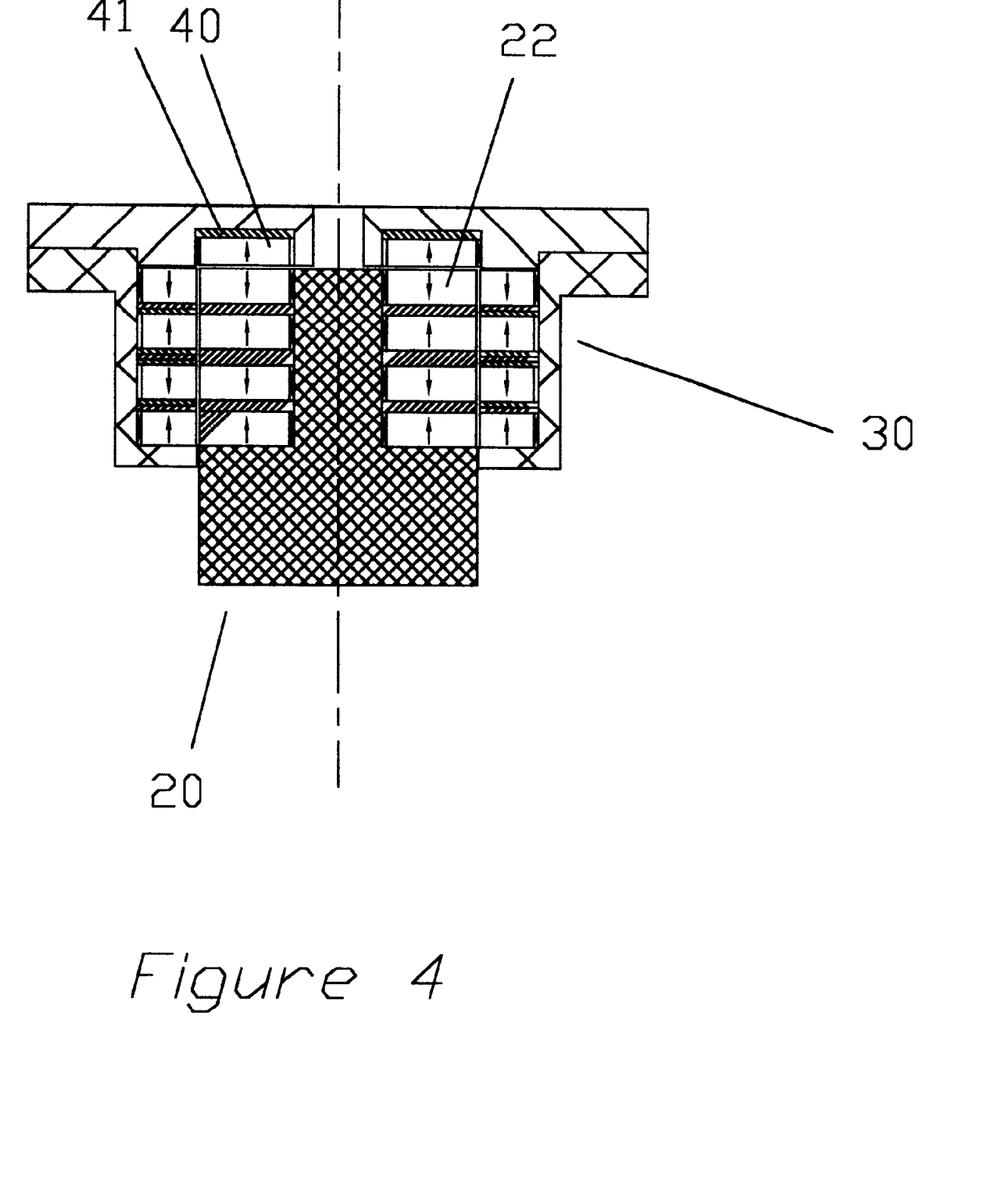
FIG. 4 is a cross sectional view of a passive magnetic support and damping system configured to provide radial stiffness and damping and in addition to rovide axial damping and an axial force.

As seen in FIG. 4, this repulsive force between a rotor magnet 22 and the additional magnet 40 can also be utilized to introduce a layer of damping material 41 between the additional magnet and the machine, introducing axial damping. In this case, any undesired axial vibrations of the rotor assembly 20 would be transmitted through the repulsive force between magnets 22 and 40, resulting in axial motions of the additional stator magnet 40. This motion would be resisted by the damping material 41 resulting in frictional dissipation of the axial vibration energy, or damping.

Figure 5:
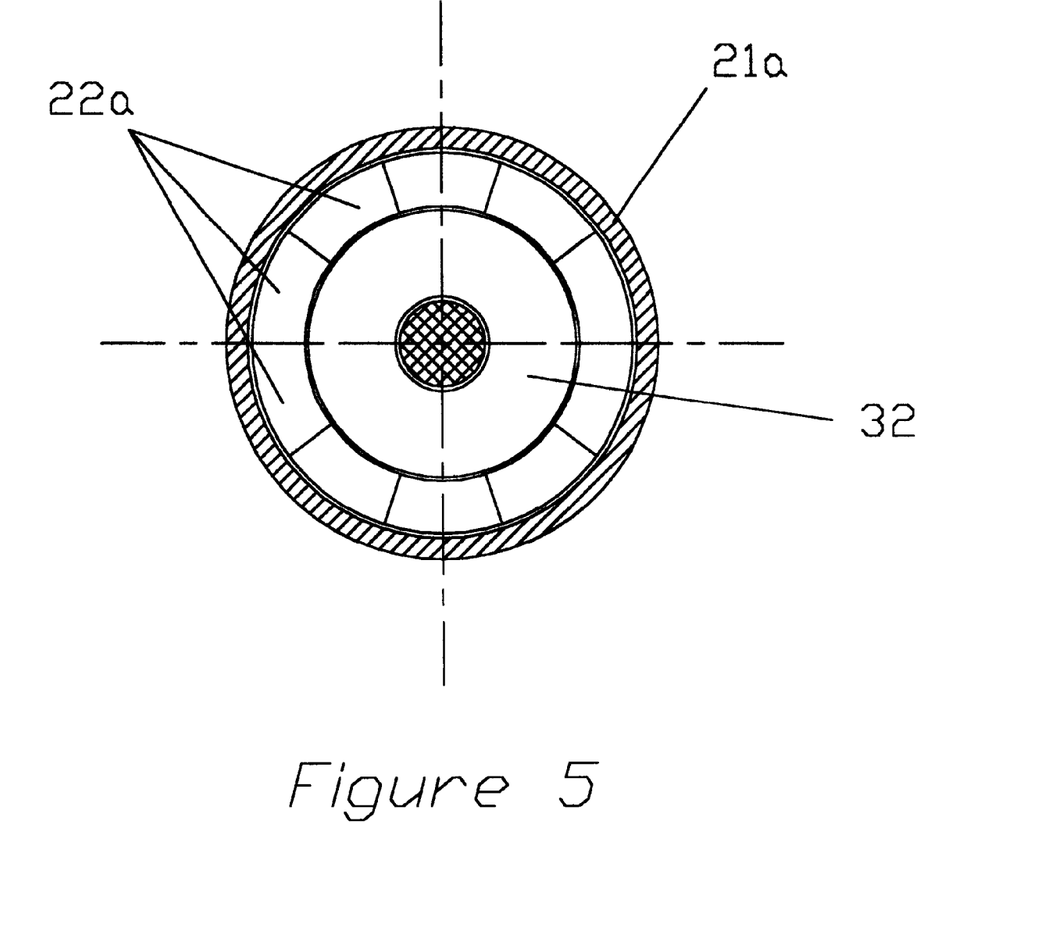
FIG. 5 is an axial view of the passive magnetic support and damping system displayed in FIG. 2, configured for large diameter and/or high speed systems.

FIG. 5 represents an axial view of the assembly displayed in FIG. 2, further configured for high-speed applications. In this example the stator magnet(s) 32 (and 34, not shown) are ring magnets mounted as described earlier. In cases in which the rotational speed is very high, or in which the rotor (outer) magnet 22 diameters are very large, it may be advantageous to manufacture those magnets from sections 22a. These sections can be bonded to, or otherwise restrained by, the rigid spacers 25. It is obvious that this same strategy can be used in cases in which the outer magnets are the stator magnets. In this case, the damper material could be positioned between rigid spacers that hold the magnet assemblies in place and fixed portions of the machine.

A further embodiment can be illustrated by FIG. 2. In this illustration, FIG. 2 is an axial cross-section of a translational passive magnetic support and damping system that provides stiffness and damping in the horizontal axis, while allowing translation in the axis that extends perpendicular to the figure such that it extends into and out of the drawing sheet. This embodiment is configured to allow translational movements, such as those used in a linear slide or a positioning table. In this case, Stationary member 30 would consist of a base 31a and a series of one or more bar magnets (32, 34). The translational moving portion of the assembly 20 similarly contains bar magnets 22 rigidly mounted into a housing 21a or the translational portion of the machine (not shown). The soft mounted magnets 32 are mounted to provide damping in the manner described earlier. The axis of movement in this example is perpendicular to the drawing page, i.e.; it extends into and out of the drawing sheet.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A passive magnetic support and damping system comprising:
   a) a rotor, said rotor having at least one permanently magnetized element attached to said rotor;
   b) a stator, said stator including at least one second permanently magnetized element made up of at least two discrete permanent magnets, whereby said rotor and said stator being arranged in a relationship whereby the permanently magnetized element of the rotor and the at least one permanently magnetized element of the stator are separated by a gap;
   c) a means for attaching each of said discrete permanent magnets in said stator individually to a fixed support; and
   d) wherein the means for attaching each of said discrete permanent magnets in said stator individually to a fixed support includes a means for dampening vibrations in one of said discrete permanent magnets and, consequently, dampening vibrations in the at least one permanently magnetized element attached to said rotor.

2. The passive magnetic support and damping system of claim 1 further comprising a means for limiting the radial displacement of the at least one second permanently magnetized element, thereby resulting in increased stiffness of said passive magnetic support and damping system as a vibrational amplitude of the rotor increases.

3. The passive magnetic support and damping system of claim 1 wherein the at least one second permanently magnetized element has a range of motion, and further wherein said range of motion is limited, to create a non-linear stiffness in response to large displacements of said rotor.

4. The passive magnetic support and damping system of claim 1 wherein one of the at least two discrete permanent magnets is made up of a plurality of magnets and is surrounded by a damping material, and the other of the at least two discrete permanent magnets is made up of a plurality of magnets that are fixed to said fixed support.

5. The passive magnetic support and damping system of claim 1 wherein the at least one said second permanently magnetized element includes a means of producing axial forces between said rotor and said stator.

6. The passive magnetic support and damping system of claim 1 wherein the rotor is positioned outside of the stator.

7. The passive magnetic support and damping system of claim 6 wherein the at least one permanently magnetized element on said rotor is made of sections.

8. The passive magnetic support and damping system of claim 6 wherein the at least two discrete permanent magnets are made of sections.

9. The passive magnetic support and damping system of claim 1 wherein the at least one permanently magnetized element on said rotor is made of sections.

10. The passive magnetic support and damping system of claim 1 wherein the rotor and the stator have a relative motion, and further wherein said relative motion is translational.

11. The passive magnetic support and damping system of claim 1 wherein the support for said stator is a machine housing.

12. The passive magnetic support and damping system of claim 1 wherein the means for attaching each of said discrete permanent magnets in said stator individually to a fixed support provides a primary support and a dampening force that is radial.

13. The passive magnetic support and damping system of claim 12 further comprising: at least one first axial magnet attached to said rotor and at least one second axial magnet attached to said stator, whereby said first and second axial magnets generate axial forces.

14. The passive magnetic support and damping system of claim 1 wherein the means for dampening vibrations is a viscoelastic material.

15. The passive magnetic support and damping system of claim 1 wherein the means for dampening vibrations is a woven metal material.

16. A passive magnetic support and damping system comprising:
   a) a rotor, said rotor being comprised of a first array of permanently magnetized elements arranged in a side-by-side relationship;
   b) a second array of permanently magnetized elements also arranged in a side-by-side relationship the combination of which acts as a stator, whereby, said rotor and said stator being arranged in a concentric relationship with a radially extending gap therebetween;

c) a support means for said second array of permanently magnetized elements, wherein each of said second array of permanently magnetized elements is individually attached to a fixed support; and d) wherein at least one of the elements in said second array is attached to said fixed support with a means for damping the radial vibrations thereof.

17. The passive magnetic support and damping system of claim 16 further comprising a means for limiting the radial displacement of at least one of the elements in said second array, thereby resulting in increased stiffness of the passive magnetic support and damping system as a vibrational amplitude of the rotor increases.

18. The passive magnetic support and damping system of claim 16 wherein at least one of the elements in said second array of permanently magnetized elements has a range of motion, and further wherein said range of motion is limited, to create a nonlinear stiffness in response to large displacements of said rotor.

19. The passive magnetic support and damping system of claim 16 wherein the second array of permanently magnetized elements includes a first plurality of magnets and a second plurality of magnets, wherein the first plurality of magnets is surrounded by a damping material, and the second plurality of magnets is fixed in place.

20. The passive magnetic support and damping system of claim 16 wherein the second array of permanently magnetized elements includes a means of producing axial forces between said rotor and said stator.

21. The passive magnetic support and damping system of claim 16 wherein the rotor is positioned outside of the stator.

22. The passive magnetic support and damping system of claim 21 wherein the first array of permanently magnetized elements is made of sections.

23. The passive magnetic support and damping system of claim 21 wherein the second array of permanently magnetized elements is made of sections.

24. The passive magnetic support and damping system of claim 16 wherein the first array of permanently magnetized elements is made of sections.

25. The passive magnetic support and damping system of claim 16 wherein the second array of permanently magnetized elements is made of sections.

26. The passive magnetic support and damping system of claim 16 wherein the means for damping the radial vibrations is a viscoelastic material.

27. The passive magnetic support and damping system of claim 16 wherein the means for damping the radial vibrations is a woven metal material.

28. A passive magnetic support and damping system comprising:

a) a rotor, said rotor having at least one permanently magnetized element attached to said rotor;

b) a stator, said stator including at least one second permanently magnetized element, whereby said rotor and said stator being arranged in a relationship whereby the permanently magnetized element of the rotor and the at least one permanently magnetized element of the stator are separated by a gap and further wherein the permanently magnetized element of the rotor and the at least one permanently magnetized element of the stator are positioned in opposite polarity (repulsion);

c) a means for attaching the at least one permanently magnetized element of the stator to a fixed support; and d) a means for attaching the at least one permanently magnetized element of the stator to a fixed support includes a means for dampening vibrations in the at least one permanently magnetized element of the stator and, consequently, dampening vibrations in the at least one permanently magnetized element attached to said rotor.

* * * * *